United States Patent [19]

Ishida

[11] Patent Number: 5,535,332
[45] Date of Patent: Jul. 9, 1996

[54] SHARED-DATA ALTERATION STATUS MANAGEMENT APPARATUS

[75] Inventor: Eiji Ishida, Kanagawa, Japan

[73] Assignee: Fuji Xerox Co., Ltd., Tokyo, Japan

[21] Appl. No.: 533,941

[22] Filed: Sep. 26, 1995

Related U.S. Application Data

[63] Continuation of Ser. No. 82,967, Jun. 29, 1993, abandoned.

[30] Foreign Application Priority Data

Jun. 30, 1992 [JP] Japan ................................. 4-194707

[51] Int. Cl.$^6$ .................................................. G06F 15/40
[52] U.S. Cl. .............................. 395/200.01; 364/225.8; 364/943.44
[58] Field of Search ........................... 395/200.01, 425, 395/600, 200.08

[56] References Cited

U.S. PATENT DOCUMENTS

| | | | |
|---|---|---|---|
| 4,962,532 | 10/1990 | Kasiraj | 380/25 |
| 5,093,918 | 3/1992 | Heyen | 395/725 |
| 5,113,519 | 5/1992 | Johnson | 395/600 |
| 5,287,504 | 2/1994 | Carpenter | 395/600 |

FOREIGN PATENT DOCUMENTS

| | | |
|---|---|---|
| 2-2450 | 1/1990 | Japan . |
| 3-58658 | 3/1991 | Japan . |
| 3-119477 | 5/1991 | Japan . |
| 3-119478 | 5/1991 | Japan . |
| 3-119476 | 5/1991 | Japan . |

OTHER PUBLICATIONS

"WYSIWIS Revised: Early Experiences with Multisuer Interfaces," M. Stefik et al., ACM Transactions on Office Information Systems, vol. 5, No. 2, Apr. 1987, pp. 147–167.

"Team Work Station: Towards A Seamless Shared Wordspace",: H. Ishii, CSCW '90 Proceedings, Oct. 1990, pp. 13–26.

"Multimedia Distribution Meeting System MERMAID," K. Watanabe et al., Data Processing Academy Paper, vol. 32, No. 9, Sep. 1991, pp. 1200–1209.

"Semistructured Messages Are Surprisingly Useful for Computer–Supported Coordination," T. W. Malone et al., ACM Transaction on Office Information Systems, vol. 5, No. 2, Apr. 1987, pp. 115–131.

"Intelligent Information–Sharing Systems," T. W. Malone et al., Communication of the ACM, vol. 30, No. 5, May 1987, pp. 390–402.

*Primary Examiner*—David Y. Eng
*Attorney, Agent, or Firm*—Finnegan, Henderson, Farabow, Garrett & Dunner

[57] ABSTRACT

A shared-data alteration status grasping system includes a shared-data control server 1 for storing the shared data and for recording a alterations status of the alterations of the shared data and alteration levels thereof, an edit client 2 for carrying out the process to edit the shared data, a display client 3 for stepwise displaying the alterations of the shared data on the basis of the alteration-status data that is stored in the shared-data control server in accordance with the role and interest levels of each user, and a network 4 for connecting the server and the clients. With such an arrangement, the system provides the visual information of the alterations of the shared data in the group, while the display details is varied in accordance with the significance of the role of each member and the intensity of his interest.

17 Claims, 13 Drawing Sheets

FIG. 4

| ALTERATION TIME | CONTENTS OF ALTERATION |
|---|---|
| 1992.2.14,10:34.98 | $%FFYTYY···ehiehii(DIFFERENTIAL DATA) |

FIG. 5

| TYPE | CONTENTS | ALTERATION LEVEL |
|---|---|---|
| DOCUMENT PREPARATION/DELETE | 100KByte OR MORE | 5 |
| DOCUMENT PREPARATION/DELETE | 50KByte OR MORE | 4 |
| DOCUMENT PREPARATION/DELETE | LESS THAN 50KByte | 3 |
| DOCUMENT MOVEMENT/NAME CHANGE | 100KByte OR MORE | 4 |
| DOCUMENT MOVEMENT/NAME CHANGE | 50KByte OR MORE | 3 |
| DOCUMENT MOVEMENT/NAME CHANGE | LESS THAN 50KByte | 2 |
| CHARACTER ADD/CORRECT/DELETE | 1000WORDS OR MORE | 3 |
| CHARACTER ADD/CORRECT/DELETE | 100WORDS OR MORE | 2 |
| CHARACTER ADD/CORRECT/DELETE | LESS THAN 100WORDS | 1 |
| LINK ADD/DELETE/CORRECT | LINK SHOWING A PROCESS FLOW | 5 |
| LINK ADD/DELETE/CORRECT | LINK SHOWING A REFERENCE | 3 |

FIG. 6

| ALTERED TIME | ALTERATION DETAIL | ALTERATION LEVEL |
|---|---|---|
| 1992. 2. 14, 10:34.43 | $%FFYTYY···ehiehii(DIFFERENTIAL DATA) | 5 |
| 1992. 2. 15, 09:44.11 | 478HU*&···678&673%¢(DIFFERENTIAL DATA) | 3 |
| 1992. 2. 15, 13:45.04 | ¢¢&¢&&78¢···#%&***&(DIFFERENTIAL DATA) | 2 |
| 1992. 2. 15, 15:34.26 | !!$%#D*&*···**&&EJJF(DIFFERENTIAL DATA) | 1 |
| 1992. 2. 17, 23:37.00 | ¢¢D&66¢¢···```;LJFOF(DIFFERENTIAL DATA) | 1 |
| 1992. 2. 20, 08:09.03 | CJDHIEO···678&673%¢(DIFFERENTIAL DATA) | 5 |
| 1992. 2. 20, 12:34.56 | FFTRT···CGG%$¢¢&¢&(DIFFERENTIAL DATA) | 3 |

FIG. 7

| MEMBER | ROLE/INTEREST LEVELS | LAST ACCESS |
|---|---|---|
| MR. A | 3 | 1992. 2. 13, 1:32.11 |
| MR. B | 4 | |
| MR. C | 5 | 1992. 2. 20, 09:34.34 |
| MR. D | 2 | 1992. 2. 20, 04:12.32 |
| | | 1992. 2. 16, 17:25.46 |

FIG. 8

| ALTERED TIME | ALTERATION CONTENTS | ALTERATION LEVEL |
|---|---|---|
| 1992.2.14, 10:34.43 | $%FFYTYY···ehiehii (DIFFERENTIAL DATA) | 5 |
| 1992.2.15, 09:44.11 | 478HU*&···678&673%¢ (DIFFERENTIAL DATA) | 3 |
| 1992.2.20, 08:09.03 | RR56¢¢*&···¢¢&D¢D&S (DIFFERENTIAL DATA) | 5 |
| 1992.2.20, 12:34.56 | FFTRT···CGG%$¢¢&&(DIFFERENTIAL DATA) | 3 |

FIG. 9

| MEMBER | OBJECT ID OF THE SHARED DATA | ROLE AND INTEREST LEVELS |
|---|---|---|
| MR. A | AAA321 | 3 |
| MR. A | AAA345 | 2 |
| MR. A | ASA355 | 1 |
| MR. B | AA4578 | 5 |
|  |  |  |
|  |  |  |

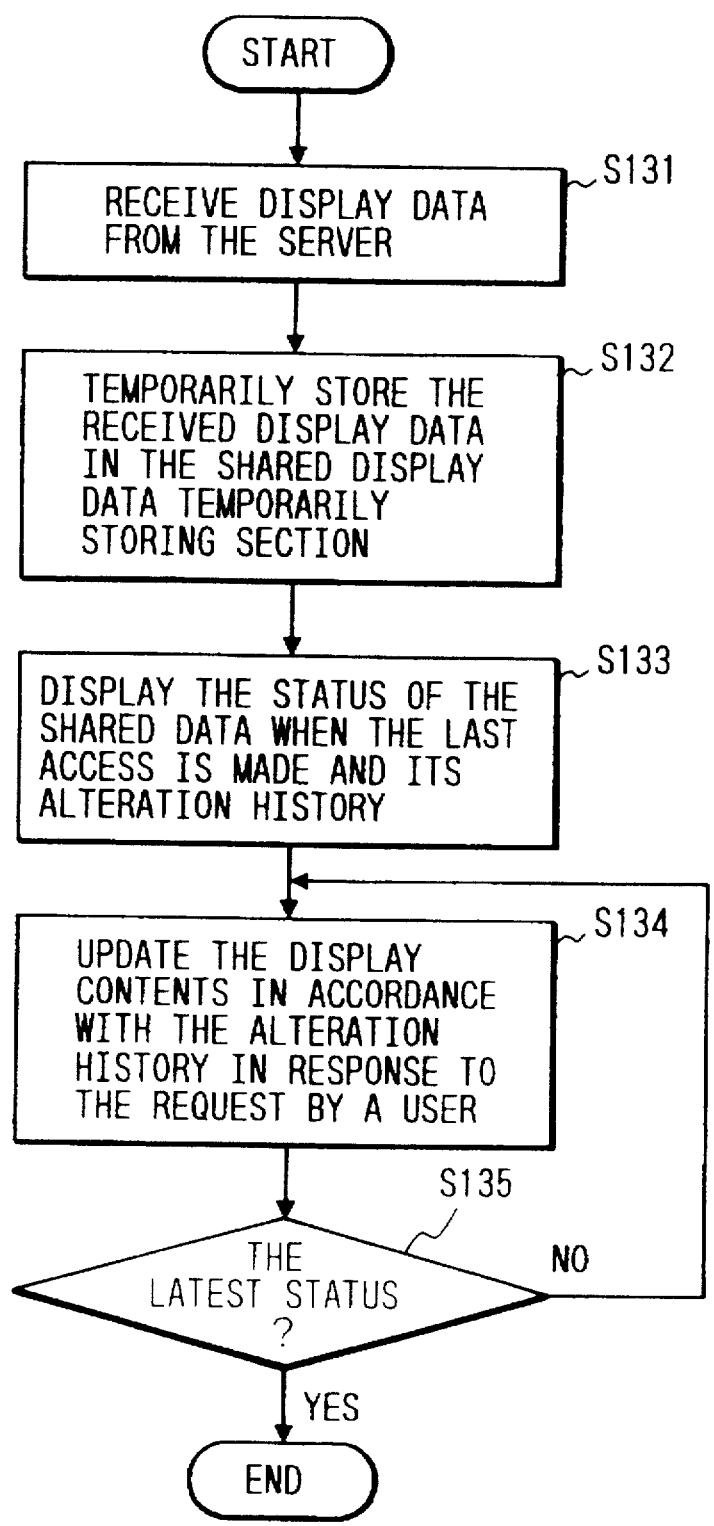

SHARED-DATA ALTERATION STATUS MANAGEMENT APPARATUS

This application is a continuation, of application Ser. No. 08/082,967 filed Jun. 29, 1993, now abandoned.

BACKGROUND OF THE INVENTION

1. Field of the Invention

The present invention relates to a cooperated computer supported coordination system for sharing information in a group, and more particularly to an apparatus for managing a shared-data alteration status.

2. Discussion of the Prior Art

The following three techniques may be enumerated for the prior art of the present invention.

The first technique is the shared file technique as described in the drawer [Article 1] and Shared Book [Article 2] in Start Work Station by Xerox corporation.

The second technique is the shared window system as described in Clab System [Article 3] by Xerox Palo Alto Laboratory, Team Workstation [Articles 4 to 7] by NTT (Nippon Telephone and Telegraph corporation), and MERMAID [Articles 8 and 9] by NEC corporation.

The third technique is the semistructured automatic mail distribution system as discussed in Object Lens [Articles 10 and 11] by MIT.

Particulars of the references are as follow.

Article 1: "Work Station Series" edited by Akihiro, published by Maruzen, 1986.

Article 2: Published Unexamined Japanese Patent Application Hei-2-2450(filed by Xerox corporation), entitled "Expression of Cooperation Multiuser Activities on Share Structured Data Object in the Network Work Station Ambient.

Article 3: Stefik, M.; Bobrow, D. G.; Foster, G.; Lanning S.; and Tatar, D. "WYSIWIS:Revised:Early Experiences with Multiuser Interfaces", ACM Transactions on Office Information Systems, Vol., 5, No. 2, April 1987, pp. 147 to 167.

Article 4: Ishii Hiroshi, "TeamWorkstation: Towards a Seamless Shared Workspace." CSCW '90 Proceedings, October 1990, pp13 to 26.

Article 5: Published Unexamined Japanese Patent Application Hei-3-119476 (NTT), entitled "Shared Screen Control System".

Article 6: Published Unexamined Japanese Patent Application Hei-3-119477 (NTT), entitled "Shared Screen Control System".

Article 7: Published Unexamined Japanese Patent Application Hei-3-119478 (NTT), entitled "Shared Screen Control System".

Article 8: Kazuo Watanabe, Shiro Handa, Kazutoshi Maeno, Hideyuki Fukuoka, Toyoko Ohmori, "Multimedia Distribution Meeting System MERMAID", Data Processing Academy papers, Vol., 32, No. 9, September 1991, pp 1200 to 1209.

Article 9: Published Unexamined Japanese Patent Application Hei-3-58658 (NEC), "Distribution Meeting System".

Article 10: Malone, T. W.; Grant, K. R.; Lai, K. Y.; Rao, R. and Rosenblitt, D. "Semi-structured message are surprisingly useful for computer supported coordination.", ACM Transactions on Office Information Systems, Vol., 5, No. e, April 1987, pp 115 to 131.

Article 11: Malone, T. W.; Grant, K. R.; Turbak, F. A.; Brobst, S. A. and Cohen M. D. "Intelligent Information Sharing Systems."Communications of the ACM, 03, 390 to 402.

In the shared file technique as in the shared book and the drawer, data can be shared by the members of a group. When the shared data is altered by a member of a group, any member of the group can refer to the result of the alteration of the shared data. Further, he can discard the old shared data, viz., the data before it is altered, or preserve it as the old version. Particularly in the shared book, edit is allowed after the shared data is locked. When another member makes an access to the locked shared data, he receives a message that the shared data is locked and under editing operation.

In the shared window systems, such as Clab System and TeamWorkstation, and MERMAID, a shared window is displayed in the work stations of the respective group members in such a manner that the same content is displayed on each of the workstation. Accordingly, the individual members can know a status of the alteration of the shared data after seeing the displayed shared windows having the display contents. In the Clab system, for example, the work station of each member may have a shared window, called a shared screen, which the member accesses as he desires. The contents of the shared screen are updated by the result of the access by the member, and displayed in real time in the shared screens of other members.

In the semistructured automatic mail distribution system, such as the Object Lens, the mail is semistructured before it is distributed. The structured portions are analyzed by the knowledge processing. The most suitable member for receiving the mail is inferred on the result of the analysis, and the mail is delivered to that member.

Accordingly, the problem to be solved by the invention is how to enable the members of a group to manage the shared data according to the roles and interests of the individual members.

To this end, it is conceivable that the following three conditions must hold. The details of these conditions, and the disadvantages of the prior art in comparison with the conditions will be described.

Firstly, it is important that "Any particular controller for providing information which depends on the roles and interests is not required." If using the shared file technique, a controller sends a status of the shared data to the members according to the roles and interests of the members by means of the electronic mail, for example, a controller can provide suitable information to the members. The roles and interests of the group members constantly vary. Further, the shared data is also changed frequently. Much task is required for one controller to manage the varying roles and interests, and the varying shared data, and to properly send the status of the shared data to the members.

Secondly, it is necessary "to deal with those members who play less roles and have a little interest."

It is infrequent that the group members engage in only the work of the group. Actually, some members are merely observers or have a little interest. Transmission of the status of the alteration of the shared data to such members by using the shared window technique is not only useless but also to interrupt the works of other members.

Thirdly, "All of the shared data can always be seen." is important.

As stated above, the roles and interests of the members always vary. It should be avoided that the action to gain desired data imposes a heavy work load on the controller and other members. In the semistructured mail distribution technique, when the roles and interests of the member are varied, the rule base for mail distribution must be altered. In this case, the data already distributed cannot be seen. With retransmission of the data, all of the data might be provided. This measure, however, is not practical in that the work load of the transmitter is extremely large, and the data is transmitted again to the members having the same data.

SUMMARY OF THE INVENTION

The present invention has an object to provide a shared data managing system which satisfies the three conditions as mentioned above, and can manage the whole shared data according to the roles and interests of the individual group members.

The present invention has another object to provide a shared data managing system which can manage part of the shared data according to the roles and interests of the individual group members.

A shared-data alteration status managing system of the present invention comprises:

shared data control device (1) for controlling the data shared by group members and the data representative of a status of the alteration of the shared data, and for editing the alteration status data in accordance with levels representative of a significance of the role and an intensity of interest of a group member who issues a display request;

editing device (2) for carrying out an edit process of the shared data; and display device (3) for displaying a status of the alteration of the shared data, step by step, on the basis of the alteration status data edited in accordance with the role and interest levels, said alteration status data being received from said shared-data control device.

The present invention having such a basic construction operates in the following way. The data shared in the group is stored in the shared data control device. The shared data can be altered by the editing device as desired. After altered, the shared data control device stores a status of the alteration as alteration status data. An example of the alteration status data is alteration history data including time data indicative of a time of the shared-data alteration, alteration data indicative of the alteration contents (differential data), and level data indicative of a level of the alteration.

In response to a display request from the display device, the shared data control device edits the alteration status data in accordance with the role and interest levels of a group member.

The display device displays, step by step, a history of the alteration expressed by the alteration status data, starting with its status last accessed. In this case, the display device can display all of the detailed alterations or only large alterations in accordance with the role and interest levels of a group member who issues a display request. In this way, the display can be varied in accordance with the role and interest levels of each member.

The shared data control device described above is arranged so as to prepare the alteration status data when the shared data is altered.

The shared data control device includes a rule storing device (1f) for storing an alteration level determining rule consisting of the correspondence of degrees of alteration and alteration level values in types of alterations and the size of alteration, and a level determining device (1b) for determining a level of an alteration of the shared data by referring to the determining rule. The types of the alterations are, for example, formation, delete and movement of documents, and addition, correction, and delete of characters. The size of alteration includes the number of characters in the altered document. The degree of the alteration consists of five levels, for example.

When the shared data is edited by the editing device to be altered, the level determining device determines a level of the alteration by referring to the determining rule. The determined level, together with altered time, is stored as alteration history data (alteration status data).

A rule alteration device (1g) may be provided for altering the determining rule in the rule storing device. With provision of the rule alteration device, the determining rule can readily be set or altered even after the system is set.

The shared data control device is arranged so that when a display request is present, it carries out a process for preparing the display data.

The shared data control device includes a member data storing device (1i) for storing the role and interest levels of the group members and the time and date of the last access, and a display data preparing device (1e) for searching the alteration history data altered after the last access time/date on the basis of the role and interest levels of the member who makes the display request and the last access time/date, and for integrating the alteration history data of lower and finer alteration levels than the role and interest levels of the display-request member into the alteration history data of higher levels than the role and interest levels of the member, thereby forming the alteration history data for the step-by-step display.

In this arrangement, the display data preparing device searches the time and date of the last access of the display-request member from the member data, and all the alteration history data after that time and date. Then, the display data preparing device compares the alteration level with the role and interest levels of the member, and selects the alteration history data of a higher level than the role and interest levels on the basis of the comparison result. The data of which the alteration level is lower than the role and interest levels is integrated into the alteration history data. It is assumed now that the degree of the alteration levels, the significance of the role, and the intensity of the interest each consist of five levels, level 1 to level 5. Further, it is assumed that the time and date of the last access by the display-request member is 13:32 in Feb. 13, 1992, and the role and interest levels are each level 3. The display data preparing device searches the alteration history data after the time and date of the last access, and selects the alteration history data of the alteration level 3 or higher from the alteration history data, and integrates the alteration history data of the alteration level 2 or lower into the alteration history data of the higher alteration level. The alteration history data thus obtained is transferred to the display device. Thus, the alteration history data is properly processed in accordance with the role and interest levels of the display-request member, and transferred to the display device. Accordingly, the display device can display only the alteration defined by the role and interest levels step by step.

The shared data control device may include a member data editing device (1j) for setting or altering the member data of the member data storing device. With provision of the member data editing device, when the member is changed to another or the role and interest levels of the member are changed to other levels, the role and interest levels of the new member may readily be set anew or altered.

The same role and interest levels of the member are set for the whole shared data. If required, these levels may be set also for a part of the shared data.

To this end, the shared data control device includes a member data storing device (1i) for storing the role and interest levels of the members of a group for the whole shared data, the role and interest levels of the members of a group for a part of the shared data, and the time and date of the last access, and a display data preparing device (1e) for searching the alteration history data altered after the last access time/date on the basis of the role and interest levels of the member who makes the display request and the last access time/date, and for integrating the alteration history data of lower and finer alteration levels than the role and interest levels of the display-request member for the whole shared data and those levels of a part of the shared data into the alteration history data of higher levels than the role and interest levels of the member, thereby forming the alteration history data for the step-by-step display.

With this mode of the invention, the role and interest levels of a member A may be set in a manner that those levels are set at 3 for a part of the shared data, at 2 for another part of the shared data, and at 4 for a remaining part of the shared data. Accordingly, the shared data may be displayed in various levels of display details as the member desires. For example, a part of the shared data is displayed in a fine and detail display level, and another part is displayed in a coarse display level.

The basic construction of the invention may be applied to a network including clients and a server. A shared data managing system of this mode of the invention comprises: a shared-data control server (1) including storing device (1a, 1h, 1i) for storing the data shared by the group members, the alteration history data of the shared data, and the role and interest levels indicating the significance and the intensities of the roles and the interests of the group members, and an alteration-status display data generating device (1e) for editing the alteration history data in accordance with the role and interest levels and supplying the edited data to the client; an edit client (2) for editing the shared data; a display client (3) for display the status of the alteration of the shared data on the basis of the alteration-status display data received from the shared data control server; and a network (4) for connecting the server and the client. The data shared in the group is stored in the storing device of the shared data control server. The shared data can be altered by the edit client as desired. In this case, the level of the alteration is discerned, and the resultant level and altered data (differential data) are stored in the storing device. When another member as a display client makes a request of display the shared data, the shared data control server prepares alteration-status display data on the alteration that has been made from the last access by the display-request member up to the present, and sends the alteration-status display data to the display client. The display client displays, step by step, the data in accordance with the received alteration-status display data while updating the data toward the latest data. In this case, the display client can display either the whole alterations including the detailed alterations or only the large alterations in accordance with the role and interest levels of the display-request member. In this way, the display is progressively changed in accordance with the significance and the interest of each member of the group.

BRIEF DESCRIPTION OF THE DRAWINGS

FIG. 4 is a diagram showing an example of alteration data to be transmitted when the shared data is edited;

FIG. 5 is a table showing a level determining rule;

FIG. 6 is a table showing the contents of the alteration history data stored;

FIG. 7 is a table showing the member data;

FIG. 8 is a table showing the display transmit data;

FIG. 9 is a table showing role and interest levels of members for a part of the shared data;

FIG. 13 is a flowchart showing the process to display step by step the shared data;

DETAILED DESCRIPTION OF THE PREFERRED EMBODIMENTS

Figure 1:
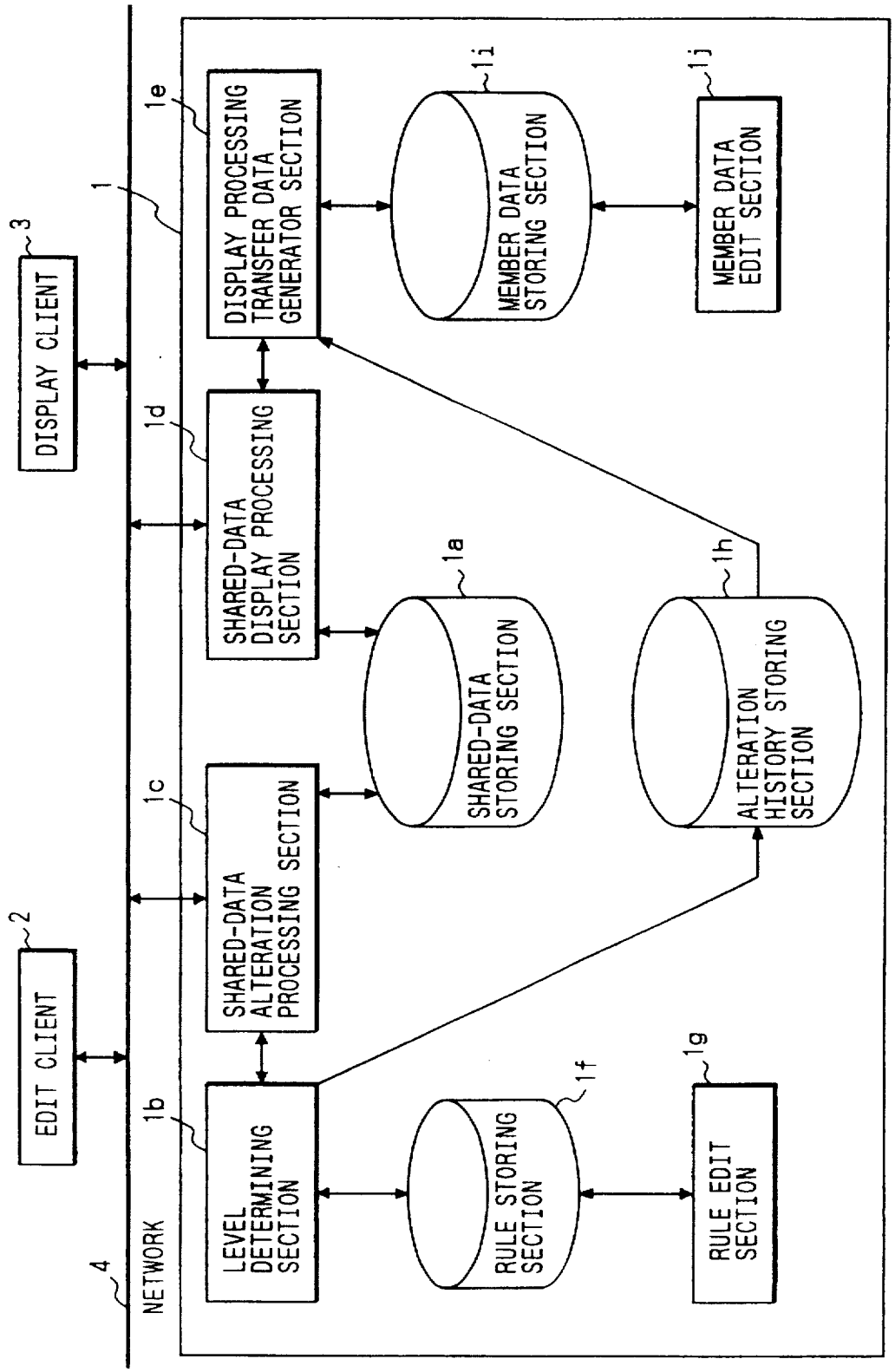
FIG. 1 is a block diagram showing the overall arrangement of a shared-data alteration status managing system according to an embodiment of the present invention.

The preferred embodiments of the present invention will be described with reference to the accompanying drawings.

The shared-data alteration status managing system is made up of a shared-data control server 1 for storing and controlling the data shared in a group, an edit client 2 for editing the shared data, a display client 3 for displaying the shared data, and a network 4 for connecting the server and the clients.

The shared-data control server 1 is made up of many sections 1a to 1j. Those sections follow. The section 1a is a shared-data storing section for storing the shared data. The section 1b is a level determining section for determining a level of the alteration of the altered shared data. The section 1c is a shared-data alteration processing section for altering the shared data and transferring the altered data to the level determining section 1b. The section 1d is a shared-data display processing section for transferring the shared data and the alteration history to the display client 3 on the basis of a display request. The section 1e is a display processing/ transfer data generator section for integrating the alteration history data into another alteration history data in accordance with the role and interest levels of a group member. The section 1f is a rule storing section for storing a rule for discerning alteration levels. The section 1g is a rule edit section for altering the rule that is stored in the rule storing section 1f. The section 1h is a alteration history storing section for storing the history of alterations of the shared data, together with their levels. The section 1i is a member data storing section for storing the role and interest levels of group members and the time and date of the last access by them. The section 1j is a member data edit section for setting or altering the member data of the member data storing device 1i.

Figure 2:
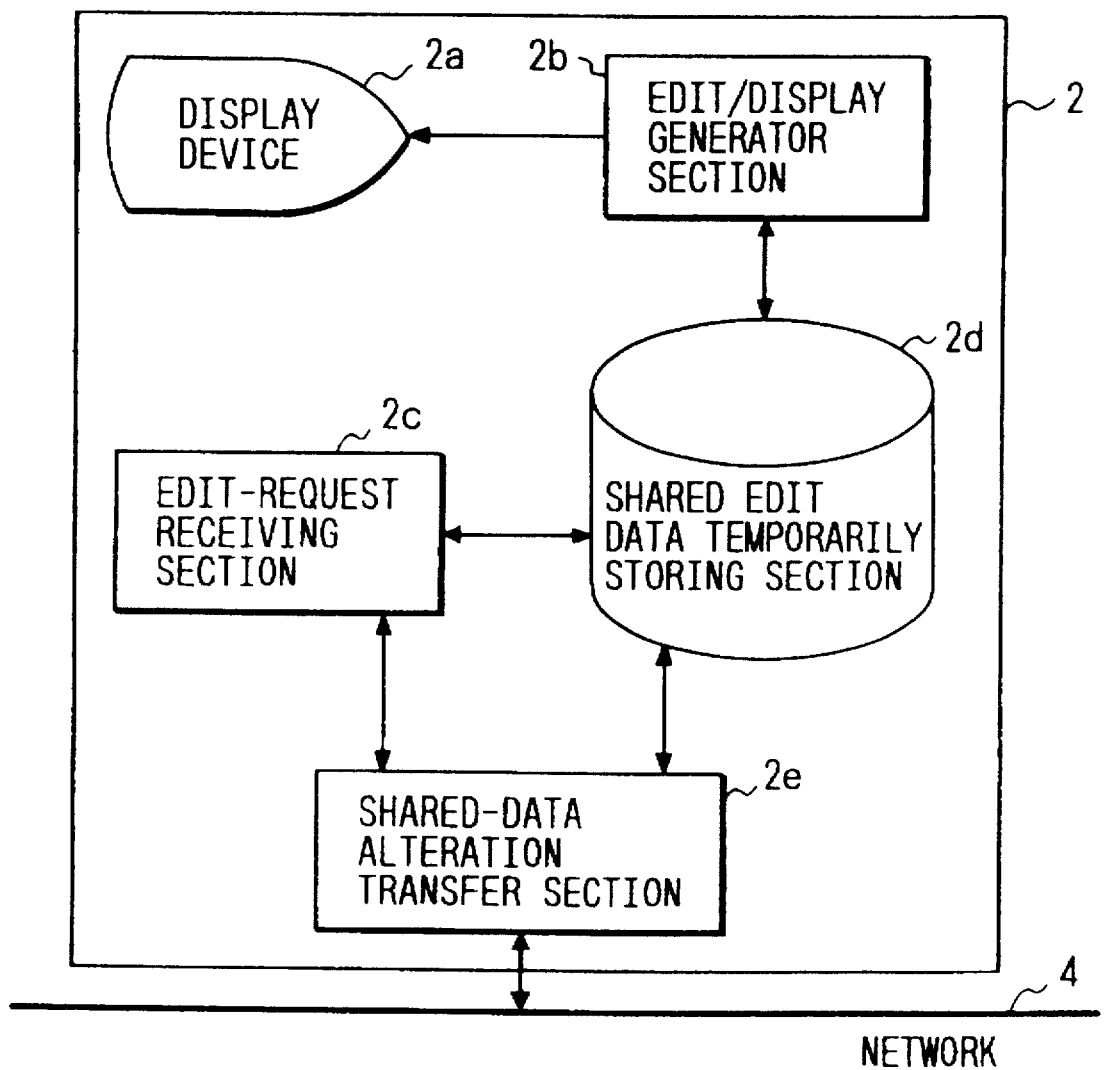
FIG. 2 is a block diagram showing the arrangement of an edit client in the shared-data alteration status managing system of FIG. 1.

As illustrated in detail in FIG. 2, the edit client 2 is made up of a display device 2a for displaying the shared data and its edit state, an edit/display generator section 2b for generating a display, an edit-request receiving section 2c for receiving an edit request from a user, a shared edit data temporarily storing section 2d for temporarily storing the shared data from the shared-data control server 1, and a shared-data alteration transfer section 2e for sending an alteration request for altering the shared data and alteration data as well to the shared-data control server 1, and for receiving data from the server.

Figure 3:
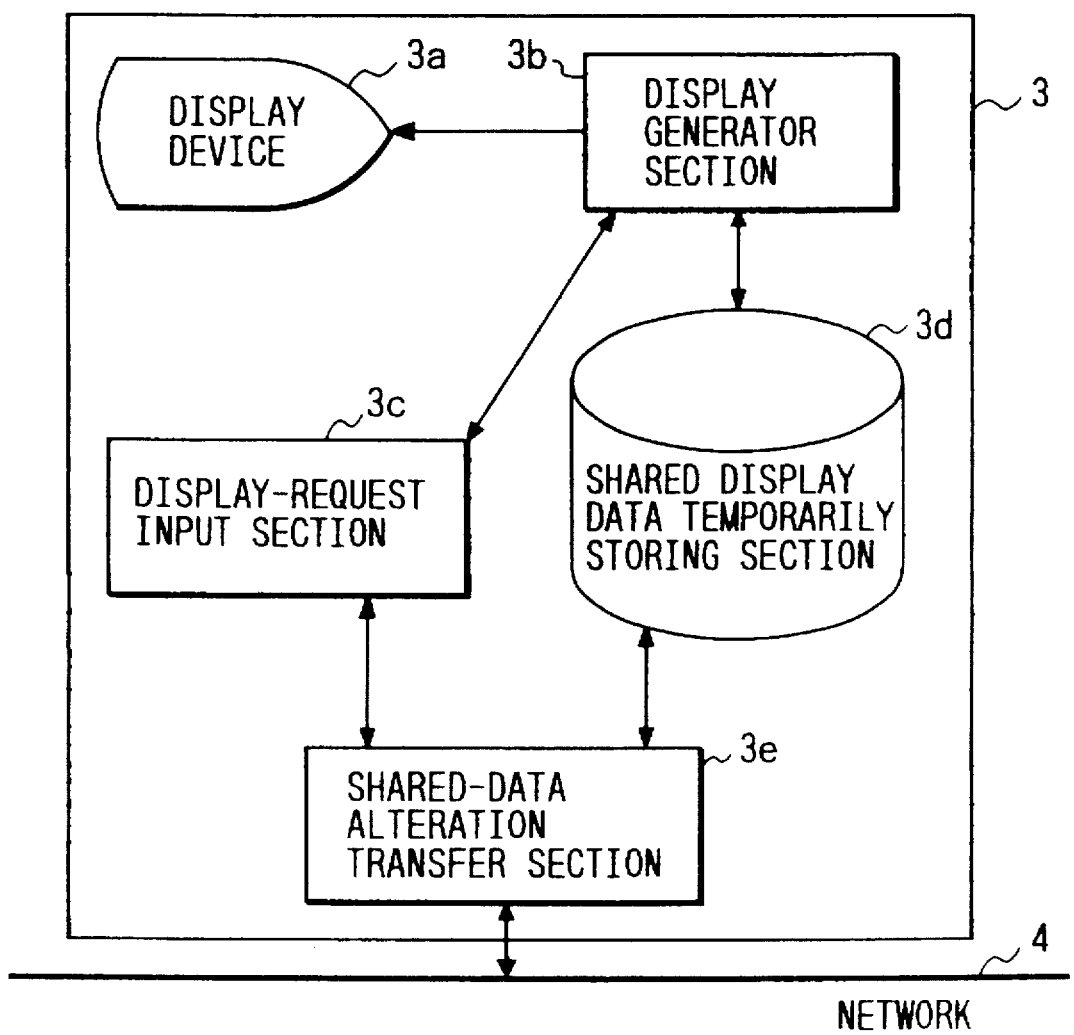
FIG. 3 is a block diagram showing the arrangement of a display client in the shared-data alteration status managing system of FIG. 1.

As illustrated in detail in FIG. 3, the display client 3 is made up of a display device 3a for displaying the shared data and its alteration history, an edit/display generator section 3b for generating a display, a display-request input section 3c for receiving a display request from a user, a shared edit data temporarily storing section 3d for temporarily storing the shared data from the shared-data control server 1, and a shared-data display-request transfer section 3e for sending a display request for displaying the shared data to the shared-data control server 1, and for receiving data from the server.

The operations of the shared-data alteration status managing system thus arranged will be described with reference to flowcharts.

Figure 10:
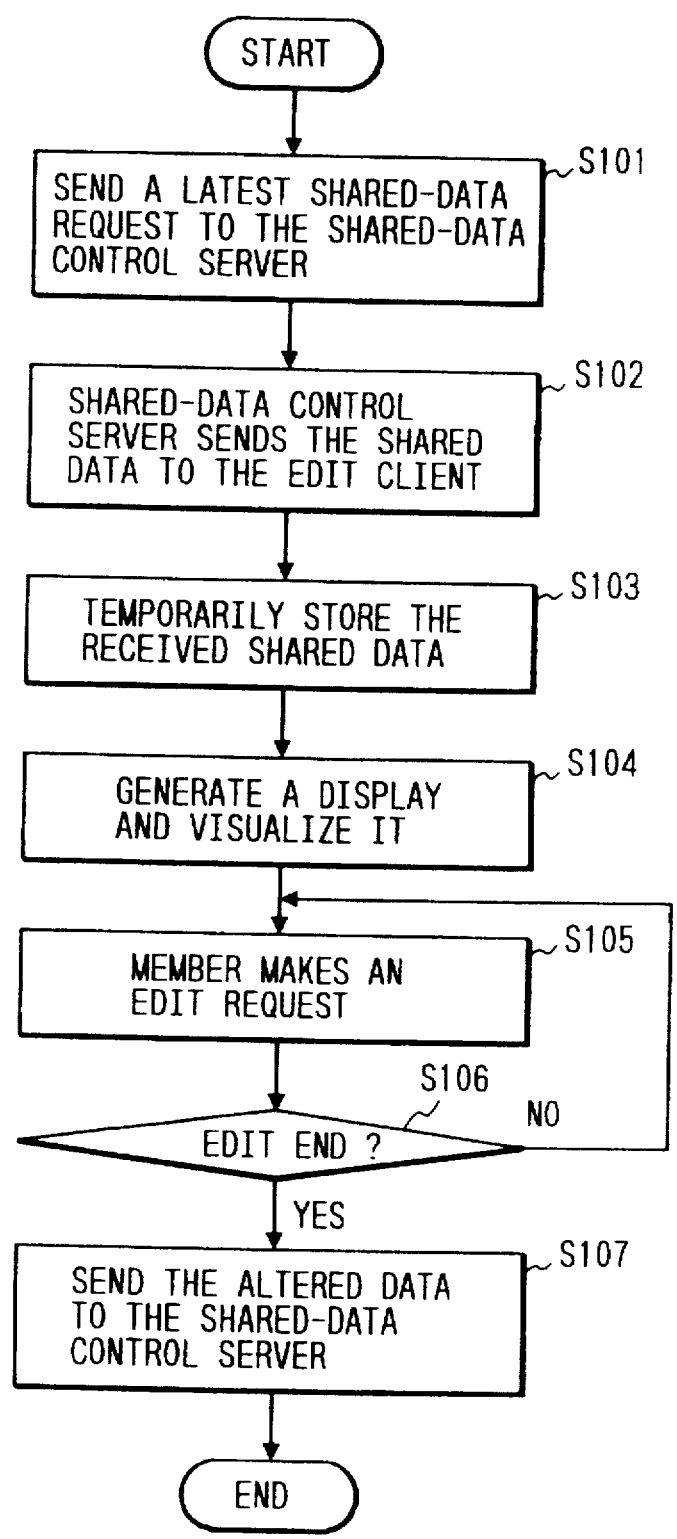
FIG. 10 is a flowchart showing an edit process for editing the shared data.

The process to edit the shared data by a member of a group will first be described. FIG. 10 is a flowchart showing an edit process for editing the shared data. When the group member starts an edit, the edit client 2 sends a latest shareddata request to the shared-data control server 1 (step S101).

When receiving the request, the shared-data alteration processing section 1c searches the shared-data storing section 1a for the latest shared data, and transfers the latest shared data to the edit client 2 (step S102).

The edit client 2 stores the received shared data into the shared edit data temporarily storing section 2d (step S103).

The edit/display generator section 2b generates a display and visualizes it by the display device 2a (step S104). After seeing the display, the group member enters an edit request by the edit-request receiving section 2c (step S105).

After the edit ends, the shared-data alteration transfer section 2e sends alteration data (differential data) having the format as shown in FIG. 4 and altered time as well to the shared-data control server 1 (step S106, 107).

Figure 11:
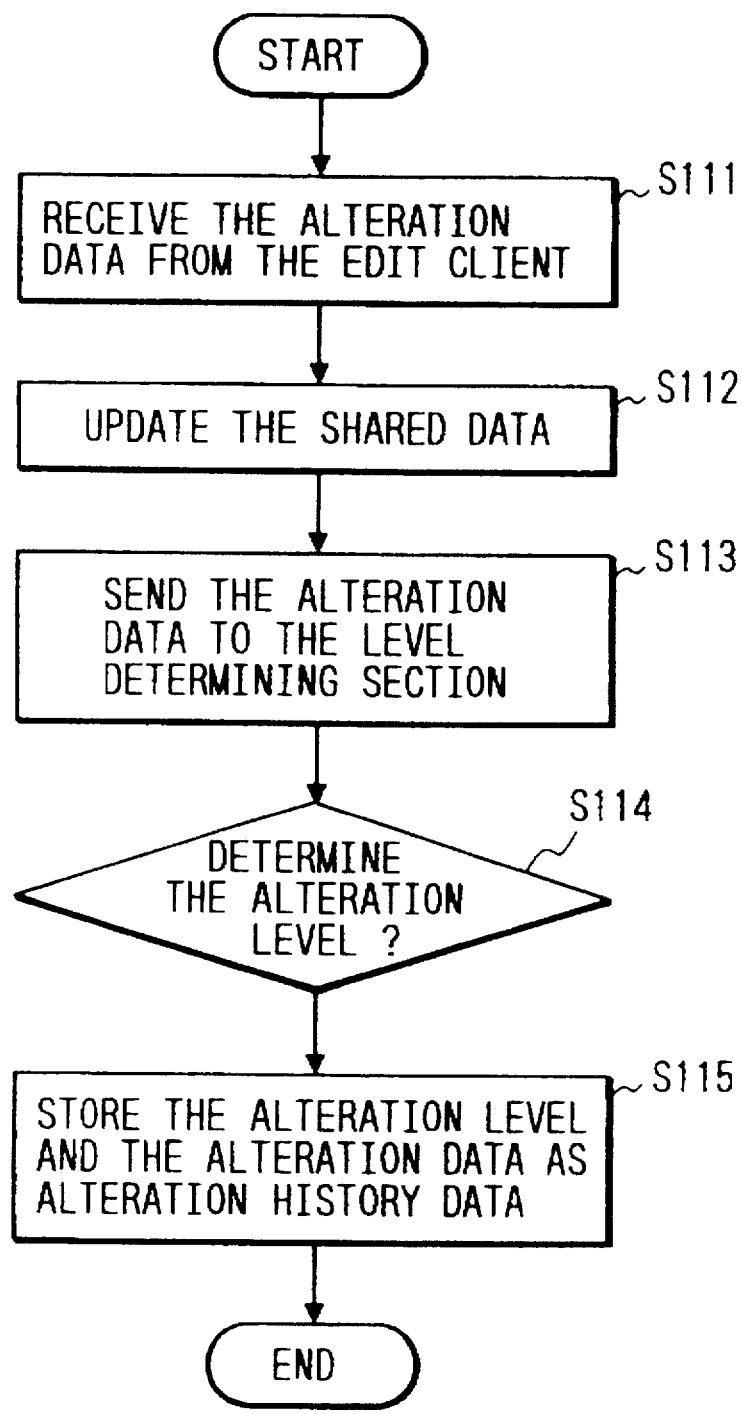
FIG. 11 is a flowchart showing the process for updating the shared data alteration and for storing the alteration history data.

FIG. 11 is a flowchart showing the process to determine the alteration level of the shared data and to store the alteration together with the level.

The shared-data alteration processing section 1c receives alteration data from the edit client 2 (step S111).

The shared-data alteration processing section 1c updates the latest shared data that is stored in the shared-data storing section 1a, on the basis of the received data (step s112).

At the same time, the shared-data alteration processing section 1c sends the alteration data to the level determining section 1b (step S113).

The level determining section 1b determines the alteration level according to the rule stored in the rule storing section 1f (step S114). The rule is tabulated as shown in FIG. 5.

The determining rule is previously stored in the rule storing section 1f by a group controller. In this case, the rule edit section 1g is used. Then, the level determining section 1b progressively stores the alteration levels, which are determined in the step S114, into the alteration history storing section 1h (step S115). In this case, the altered time and the alteration contents are also stored. Those items of data to be stored are tabulated as shown in FIG. 6.

Figure 12:
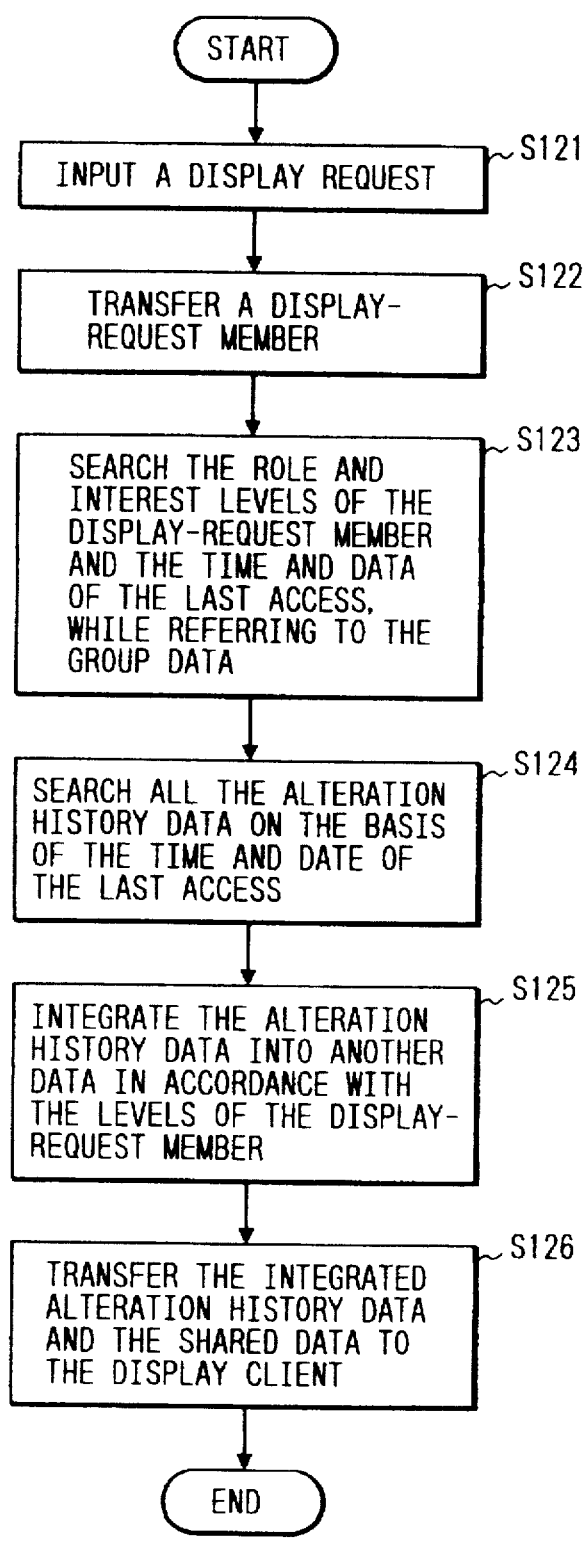
FIG. 12 is a flowchart showing the process to update the latest shared data and the process to transfer the alteration history data.
Figure 14A:
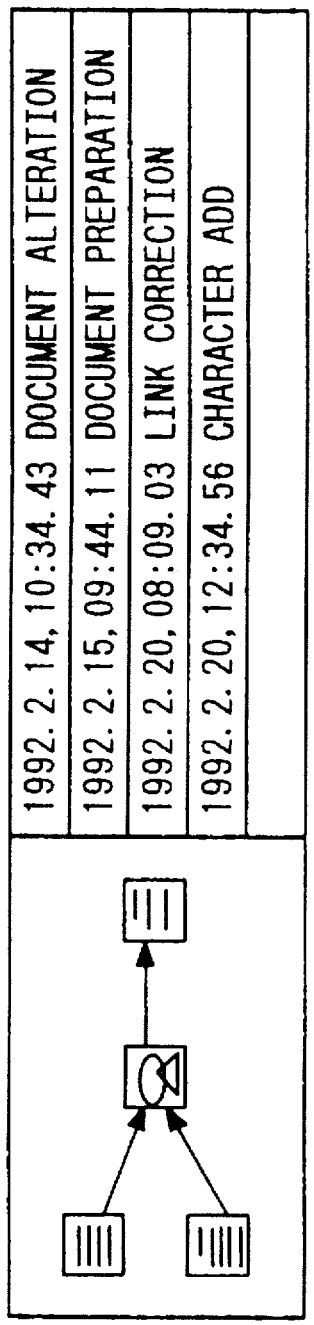
FIGS. 14a–14e is a diagram showing a series of displays on the display screen that are carried out according to the stepwise display process.
Figure 14B:
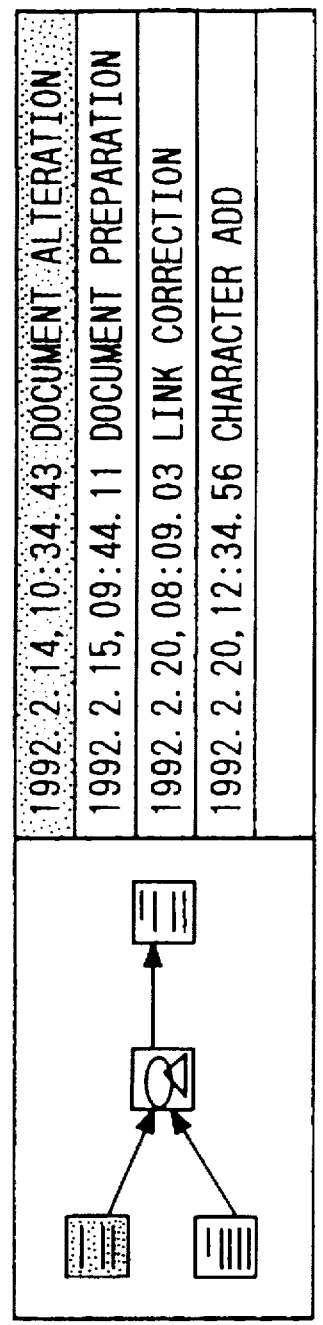
Figure 14C:
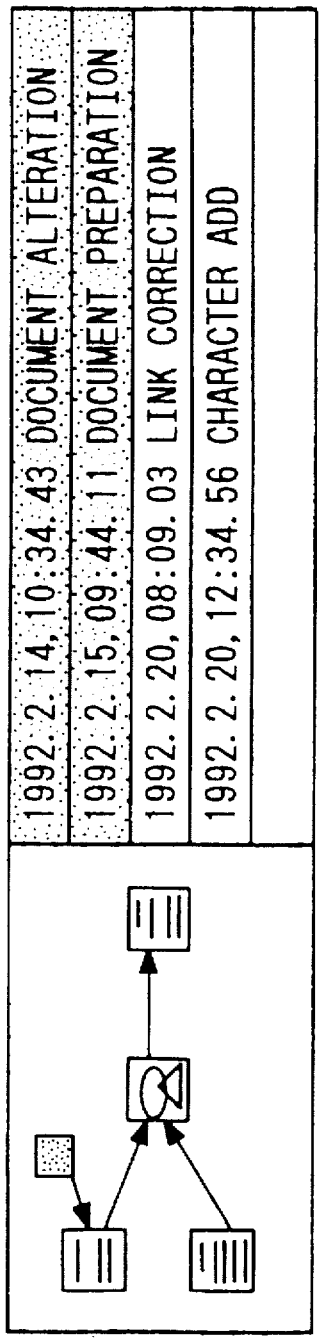
Figure 14D:
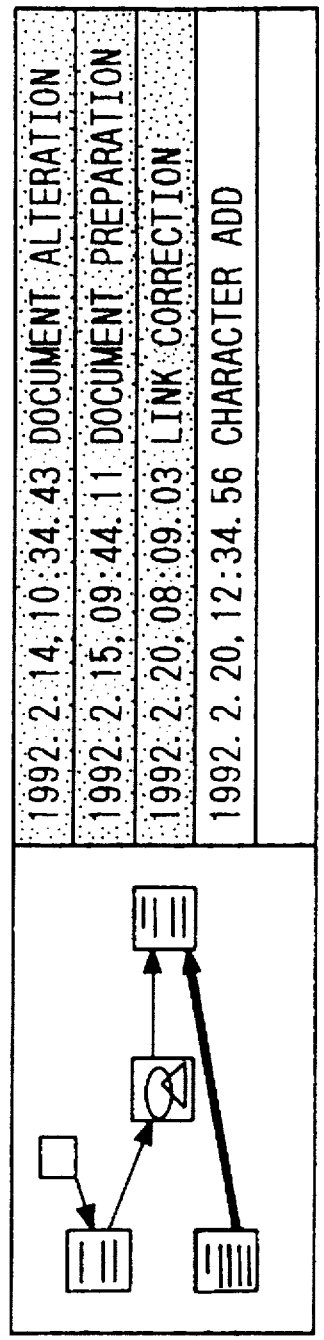
Figure 14E:
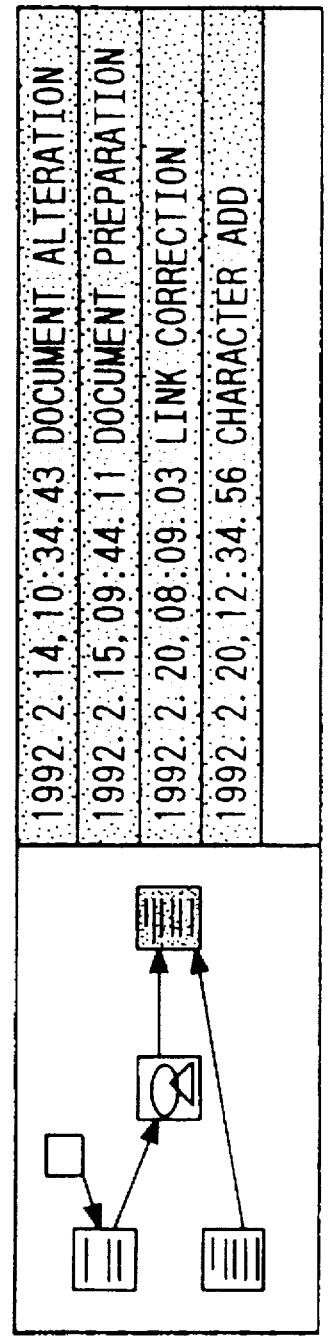

The process to display the shared data by another member in the group will be described. FIG. 12 is a flowchart showing the process when in response to a request by the member, the display data is sent to the display client 3.

Each member enters a display request for display the shared data by the display-request input section 3c (step S121).

The display request is transferred to the shared-data display-request transfer section 3e, so that the name of the member who makes the display request is transferred thereto (step S122).

The shared-data display processing section 1d, which receives the display request, sends the name of the display-request member to the display processing/transfer data generator section 1e. The display processing/transfer data generator section 1e searches the member data storing section 1i for the member data, and gains the role and interest levels of the searched member, and the time and date of the last access (step S123). The member data is stored in the form of FIG. 7.

The role and interest levels are previously stored in the member data storing section 1i by the controller of the group. The member data edit section 1j is used for that storage. The access time and date are updated every display request. Of the alteration history data stored in the alteration history storing section 1h, all the alteration history data after the time and date of the last access are searched (step S124). The fine alterations lower than the interest level are all integrated, in accordance with the role and interest levels of the member, into the display transmit data as shown in FIG. 8 (step S125).

Finally, it is sent to the shared-data display processing section 1d. In this section, it is integrated into the latest data that is stored in the shared-data storing section 1a, and the result is transferred to the display client 3 (step S126).

FIG. 13 is a flowchart showing the process to update step by step the shared data in accordance with the alteration history data.

To start, the shared-data display-request transfer section 3e receives display data from the shared-data control server 1 (step S131).

The received data is temporarily stored in the shared display data temporarily storing section 3d (step S132).

The display generator section 3b reproduces a status of the shared data when the last access is made from the latest data and it alteration history data, and displays both the status of the last access and a list of the alteration history data (step S133).

FIG. 14 is a diagram showing a series of actual displays on a screen. A display 14a in the figure is presented when the step S133 is carried out. As shown, the status of the shared data when the last access is made is displayed on the left side in the screen. The alterations performed after the last access, altered times and alteration contents, are displayed on the right side. The member can see the shared data along the alteration history while stepwise updating it. In a display 14b, only the first alteration is updated, and a document located in the left upper portion is altered. In the subsequent displays 14c, 14d and 14, the successive alterations can be seen (step S134). When the latest status is displayed, the process ends (step S135).

The second embodiment of the present invention has substantially the same as that of the first embodiment except the process of FIG. 12 to determine the alteration levels of the shared data and to store the alterations together with the alteration levels.

Figure 15:
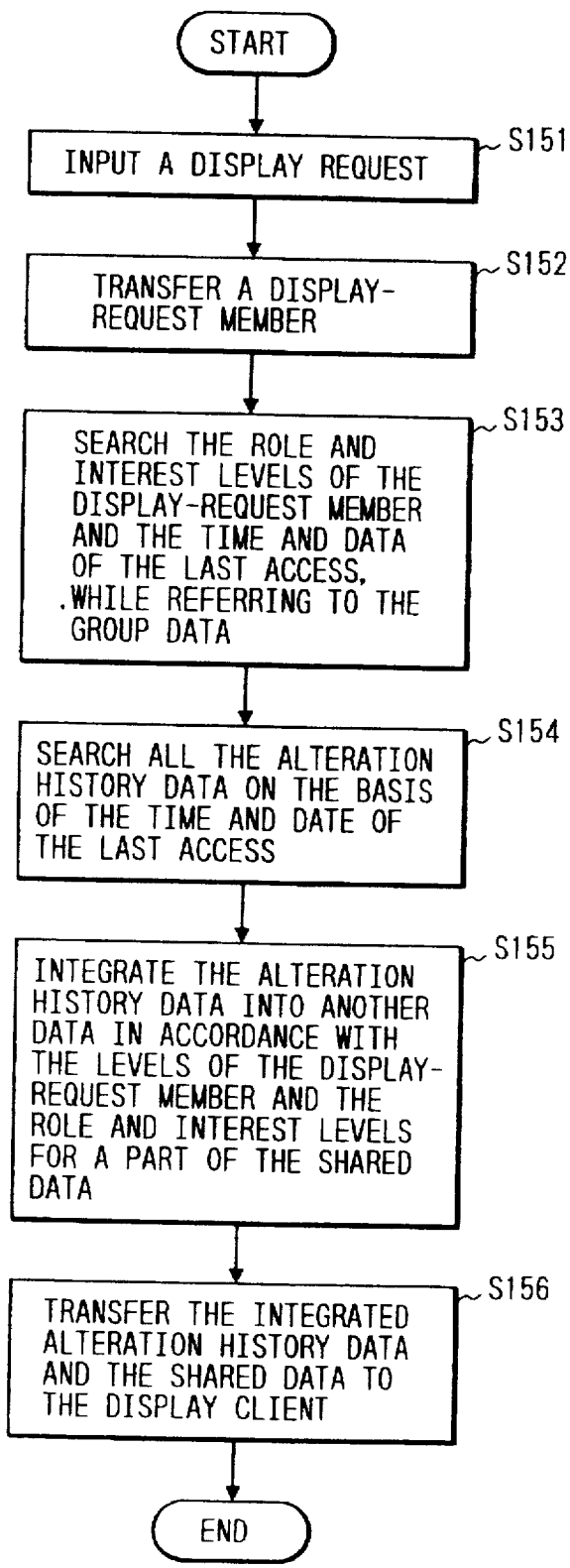
FIG. 15 is a flowchart showing the process to transmit the latest shared data and the alteration history when the role and interest levels for a part of the shared data are set up.

FIG. 15 is a flowchart showing the corresponding process according to the second embodiment. This flowchart is different from that of FIG. 12 in the box of a step S155. In this embodiment, the role and interest levels of the members for a part of the shared data (FIG. 9) and the member data shown in FIG. 7 are taken into account, when the alteration history data is integrated. The role and interest levels for a part of the shared data is previously entered by the member data edit section 1j and stored into the member data storing section 1i. Except this, the same process as that in the first embodiment is carried out, whereby serial displays as shown in FIG. 14 are presented.

In the shared-data alteration status managing system of the invention, the alterations of the shared data can be displayed in a manner that the details of the display is varied in accordance with the significance of the role and the intensity of the interest of each member in a group. Accordingly, the shared-data alteration status managing system can provide information in compliance with various types of needs of the group members. For example, when a member desires to know alterations in detail or to know the alterations briefly, the system can provide information satisfying his desires. Accordingly, the group work can be done efficiently.

The shared-data alteration status managing system can display the alterations of a part of the shared data in the display details, which are varied in accordance with each member. Accordingly, the system can provide information satisfying a user's desire to know the details of the alterations in a part of the shared data but to know a brief of the alterations in another part. Accordingly, an efficient group work is possible.

What is claimed is:

1. A shared-data alteration status management system in which different group members have different first levels of editing interest, said system comprising:

editing means for editing data shared by group members;

the group members being assigned with respective editing interest levels;

shared means for controlling the shared data and alteration status data having one or more pieces of information, each piece of information representative of a status of an alteration of said shared data by each editing operation of the editing means by a group member, said shared means generating alteration status data for display in accordance with a first editing interest level of a group member who issues a display request, the generated alteration status data for the respective editing interest levels having respective representations of pieces of the information in correspondence to the level of interest; and display means for changing said shared data progressively in accordance with said generated alteration status data received from said shared-data control means, said display means progressively displaying the changing shared data.

2. The shared-data alteration status management system according to claim 1, in which said alteration status data includes alteration history data containing time data indicative of a time of each alteration of said shared-data, alteration data indicative of contents of said each alteration, and level data indicative of a second level assigned to said each alteration.

3. The shared-data alteration status management system according to claim 2, in which said shared controlling means includes:

rule storing means for storing a second level determining rule which connects degrees of alteration and values of the second level, the degrees of alteration being functions of types of alteration and sizes of the alteration; and second level determining means for determining a value of the second level of an alteration of said shared data by referring to said second level determining rule.

4. The shared-data alteration status management system according to claim 3, further comprising a rule alteration means for altering said second level determining rule in said rule storing means.

5. The shared-data alteration status management system according to claim 2, in which said shared controlling means includes:

member data storing means for storing said respective first levels of group members and for storing times of the last access by the respective group members; and display data preparing means for searching the alteration history data altered after a last access time of a group member, who has made a display-request, with searching being done on a basis of said first level of the display-request member and the last access time of the display-request member, said display data preparing means integrating each first piece of said alteration history data, which piece has lower second level than said first level of the display-request member, into a second piece of said alteration history data, which has a higher second level than said first level of the display-request member, thereby forming said alteration history data for displaying the progressively changed shared data.

6. The shared-data alteration status management system according to claim 5, in which said shared controlling means includes member data editing means for setting or altering said member data of said member data storing means.

7. The shared-data alteration status management system according to claim 2, in which said shared controlling means includes:

member data storing means for storing third levels of the members of a group for at least a part of said shared data, and times of the last access by the members, and display data preparing means for searching said alteration history data altered after a last access time of a group member, who has made a display-request, with searching being done on a basis of the first and third levels of the member and the last access time of the display-request member, said display data preparing means integrating each first piece of said alteration history data, which piece has a lower second level than said first level of the display-request member and each third piece of said alteration history data for the part of the shared data, which piece of said alteration history data has a lower second level that the third level of the display-request member, into a second piece of the alteration history data which piece has a higher level than said first and third levels of the display-request member, thereby forming the alteration history data for displaying the progressively changed shared data.

8. The shared-data alteration status management system according to claim 7, in which said shared data control means includes a member data editing means for setting or altering the member data of the member data storing means.

9. The shared-data alteration status management system according to claim 1, in which said changing means includes:

display-request input means for receiving a display request from a user;

shared-data display-request transfer means for transferring the display request to the shared-data control means and for receiving the data from the shared-data control means;

shared display data temporary storing means for temporarily storing the shared data received from the shared-data control means;

display generator means for generating shared data for display; and a display device for displaying the shared data and its alteration history.

10. A shared-data alteration status management system in which different group members have different levels of editing interest, said system comprising:

edit means for editing data shared by group members;

a shared-data control server including:

storing means for storing the shared data, alteration history data indicative of a series of alterations of the shared data, and respective first levels of alteration status data content assigned to the respective group members, and data generating means for editing the alteration history data in accordance with the first level of a group member issuing a display request to enable editing of the alteration history data, said data generating means supplying the edited alteration history data to the display-request member;

means for changing the shared data on a basis of the edited alteration history data generated by the data generating means of said shared-data control server and for displaying the changed shared data; and a network for connecting the shared-data control server, the edit means, and the changing means.

11. A shared-data alteration status management system according to claim 10, in which said storing means includes alteration history storing means for storing alteration history data containing time data indicative of a time of each alteration of the shared-data, alteration data indicative of contents of said each alteration, and level data indicative of a second level assigned to the each alteration.

12. A shared-data alteration status management system according to claim 11, in which said shared-data control server includes:

rule storing means for storing a second level determining rule which connects degrees of alteration and values of the second level, the degrees of alteration being functions of types of alteration and sizes of the alteration; and second level determining means for determining a value of the second level of an alteration of the shared data by referring to said second level determining rule.

13. The shared-data alteration status management system according to claim 12, further comprising a rule alteration means for altering said second level determining rule in said rule storing means.

14. The shared-data alteration status management system according to claim 11, in which said shared data control server includes:

member data storing means for storing the first levels of the group members and times of the last access by each group member;

means for selecting, for a display-request member, first pieces of the alteration history data which pieces are altered after the last access time of the display-request member and have higher second levels than the first level of the display-request member, on the basis of the first level of the display-request member and the last access time of the display-request member, said selecting means integrating second pieces of the alteration history data, which pieces have lower second levels than the first level of the display-request member, into the first pieces of alteration history data, thereby generating the edited alteration-status display data; and means for transferring the shared data and the edited alteration-status display data generated by the alteration-status display data generating means to the display-request member in response to the display request.

15. The shared-data alteration status management system according to claim 14, further comprising member data editing means for setting or altering the member data of said group member data storing means.

16. The shared-data alteration status management system according to claim 11, in which said shared-data control server includes:

member data storing means for storing third levels of the members of a group for at least a part of the shared data, and times of the last access by the members, and display data forming means responsive to a display-request from a group member who has made a display request to search the alteration history data altered after the last access time of the display-request member, said display data forming means integrating each third piece of the alteration history data, which third piece has a second level lower than the third level of the display-request member, into a second piece of the alteration history data which second piece has a higher level than the first and third levels of the display-request member, thereby forming the alteration history data for displaying the progressively changed shared data.

17. The shared-data alteration status management system according to claim 16, further comprising a member data editing means for setting or altering the member data of the member data storing means.

* * * * *

UNITED STATES PATENT AND TRADEMARK OFFICE
CERTIFICATE OF CORRECTION

PATENT NO. : 5,535,332
DATED : July 09, 1996
INVENTOR(S) : Eiji ISHIDA

It is certified that error appears in the above-indentified patent and that said Letters Patent is hereby corrected as shown below:

Claim 5, column 10, line 33, before "lower", insert --a--.

Signed and Sealed this

Tenth Day of December, 1996

Attest:

BRUCE LEHMAN

Attesting Officer

Commissioner of Patents and Trademarks